(12) United States Patent
Krishnan et al.

(10) Patent No.: US 10,880,347 B1
(45) Date of Patent: Dec. 29, 2020

(54) MEDIA PLAYERS FOR DIGITAL DISPLAY DEVICES USING PROXY SERVICES FOR OFFLINE CAPABILITY

(71) Applicant: Adobe Inc., San Jose, CA (US)

(72) Inventors: Kalyanaraman Balasubramaniam Krishnan, San Francisco, CA (US); Tobias Reiss, Basel (CH)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/685,797

(22) Filed: Nov. 15, 2019

(51) Int. Cl.
  *H04L 29/06* (2006.01)
  *H04L 29/08* (2006.01)
  *G06F 16/438* (2019.01)
  *H04N 21/61* (2011.01)

(52) U.S. Cl.
  CPC ...... *H04L 65/4084* (2013.01); *G06F 16/4387* (2019.01); *H04L 65/60* (2013.01); *H04L 67/02* (2013.01); *H04L 67/42* (2013.01); *H04N 21/6125* (2013.01)

(58) Field of Classification Search
  None
  See application file for complete search history.

(56) References Cited

U.S. PATENT DOCUMENTS 10,069,884 B2 * 9/2018 Gaunt ............... H04L 65/80
2020/0192558 A1 * 6/2020 Chase ............... G06F 3/04847

FOREIGN PATENT DOCUMENTS

WO WO-2012096794 A1 * 7/2012 ......... H04N 21/6587
WO WO-2016089809 A1 * 6/2016 ........... H04L 67/141

OTHER PUBLICATIONS

Gaunt, Matt, "Service Workers: An Introduction", Google, Web Fundamentals, https://developers.google.com/web/fundamentals/primers/service-workers/, updated Jul. 24, 2020, accessed Aug. 17, 2020, 14 pages.
Google, "Progressive Web Apps", https://developers.google.com/web/progressive-web-apps/, 2019, accessed Aug. 17, 2020, 4 pages.
(Continued)

*Primary Examiner* — Jeffrey R Swearingen
(74) *Attorney, Agent, or Firm* — Kilpatrick Townsend & Stockton LLP

(57) ABSTRACT

This disclosure involves generating and configuring a media player within a web browser of a digital display device. A media player is loaded within a web page executed by the digital display device. The media player initiates execution of a proxy service by registering the proxy service with the web browser. The proxy service intercepts network requests from the media player and redirects them to local storage to enable offline capability. The media player registers with a cloud media network, and in response, receives access credentials. The media player passes the access credentials to the proxy service. The media player and proxy service access the cloud media network using the access credentials to download media content and application files respectively. The proxy service uses the application files to load a new instance of the media player during a network disruption. The media player then initiates playback of the media content.

20 Claims, 10 Drawing Sheets

(56) References Cited

OTHER PUBLICATIONS

Staff Writer, Sixteen Nine, "Five HTML5 Options for Building Digital Signage Creative", https://www.sixteen-nine.net/2016/01/04/htm15-options-building-digital-signage-creative/, Jan. 4, 2016, 15 pages.

Mihalopoulos, Vangelis, Yodeck, "Digital Signage Without a Player: The good, the bade and the ugly", https://www.yodeck.com/news/digital-signage-without-player/, Jul. 12, 2017, 5 pages.

MDN Web Developers, "Cache", https://developer.mozilla org/en-US/docs/Web/API/Cache, last modified May 15, 2020, accessed Aug. 17, 2020, 13 pages.

MDN Web Developers, "IndexedDB API", https://developer.mozilla.org/en-US/docs/Web/API/IndexedDB_API, last modified May 3, 2020, accessed Aug. 17, 2020, 9 pages.

Signagecloud, "Digital Signage Content in HTML5", https://signagecloud.info/blog/digital-signage-content-html5/, Jan. 9, 2018, 5 pages.

Yooutube, "Open HTMS5 Digital Signage (online and offline) Part 1", https://www.youtube.com/watch?v=gJ2DQ8n5fxg, Sep. 8, 2013, 2 pages.

Kaufman, Lori, How-To-Geek, "How to Enable Offline Browsing in Chrome", https://www.howtogeek.com/263577/how-to-enable-offline-browsing-in-chrome/, updated Apr. 29, 2020, accessed Aug. 17, 2020, 6 pages.

Wallen, Jack in Mobility, TechRepublic, "How to Read Web Pages Offline in Android's Google Chrome", https://www.techrepublic.com/article/how-to-read-web-pages-offline-in-androids-google-chrome, Nov. 30, 2018, 13 pages.

Signagecloud, "Why Choose Signagecloud", https://signagecloud.info/features/, 2018, 5 pages.

Signagecloud, "How Cloud-Based Digital Signage Works!", https://signagecloud.info/cloud-based-digital-signage/, 2018, 4 pages.

Internet Archive Wayback Machine, "HTML5 Players", https://web.archive.org/web/20181103083154/http:/pads4.com/players/html5, Nov. 3, 2018, 2 pages.

Wout, "Offline First with Progressive Web Apps [Part 1/3]", https://medium.com/designisdead/offline-first-with-progressive-web-apps-part-1-3-102e61992567, Nov. 6, 2018, 10 pages.

* cited by examiner

MEDIA PLAYERS FOR DIGITAL DISPLAY DEVICES USING PROXY SERVICES FOR OFFLINE CAPABILITY

TECHNICAL FIELD

This disclosure generally relates to digital display devices. More specifically, but not by way of limitation, this disclosure relates to digital display devices that use proxy services with a browser-based media player to provide offline capabilities.

BACKGROUND

Digital signage allows for the presentation of dynamic media on large displays, marquees, digital billboards, menu boards, and more. An example of a digital signage device is an electronic display that presents content to the public. Such digital signage devices may include various types of hardware and software. For instance, a digital signage device may be a rectangular display mounted to a wall in a restaurant for displaying menu items, a specialized display for projecting content in large sizes to people on the street, or another type of display device.

Digital signage devices can provide advantages over static signage. For instance, the content displayed by a digital signage device can be dynamic (e.g., scrolling text, animations, etc.) rather than static imagery or lettering. In addition, digital signage simplifies the process for updating display content. For instance, updating display content for digital signage simply involves downloading new content into the digital signage device, rather than printing and mounting updates to static signage.

SUMMARY

Aspects of the present disclosure involve generating and configuring a media player within a web browser of a digital display device. For example, a web browser of a digital display device loads a media player. The media player initiates execution of a proxy service by registering the proxy service with the web browser. The proxy service intercepts network requests from the media player and redirects them to local storage to enable the media player to continue playback while disconnected from a network. The media player registers with a cloud media network, and in response, receives access credentials. The media player and proxy service access the cloud media network using the access credentials to download media content and application files respectively. The proxy service uses the application files to load a new instance of the media player when the media player crashes while the digital display device is disconnected from the network. The media player then initiates playback of the media content. These illustrative examples are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
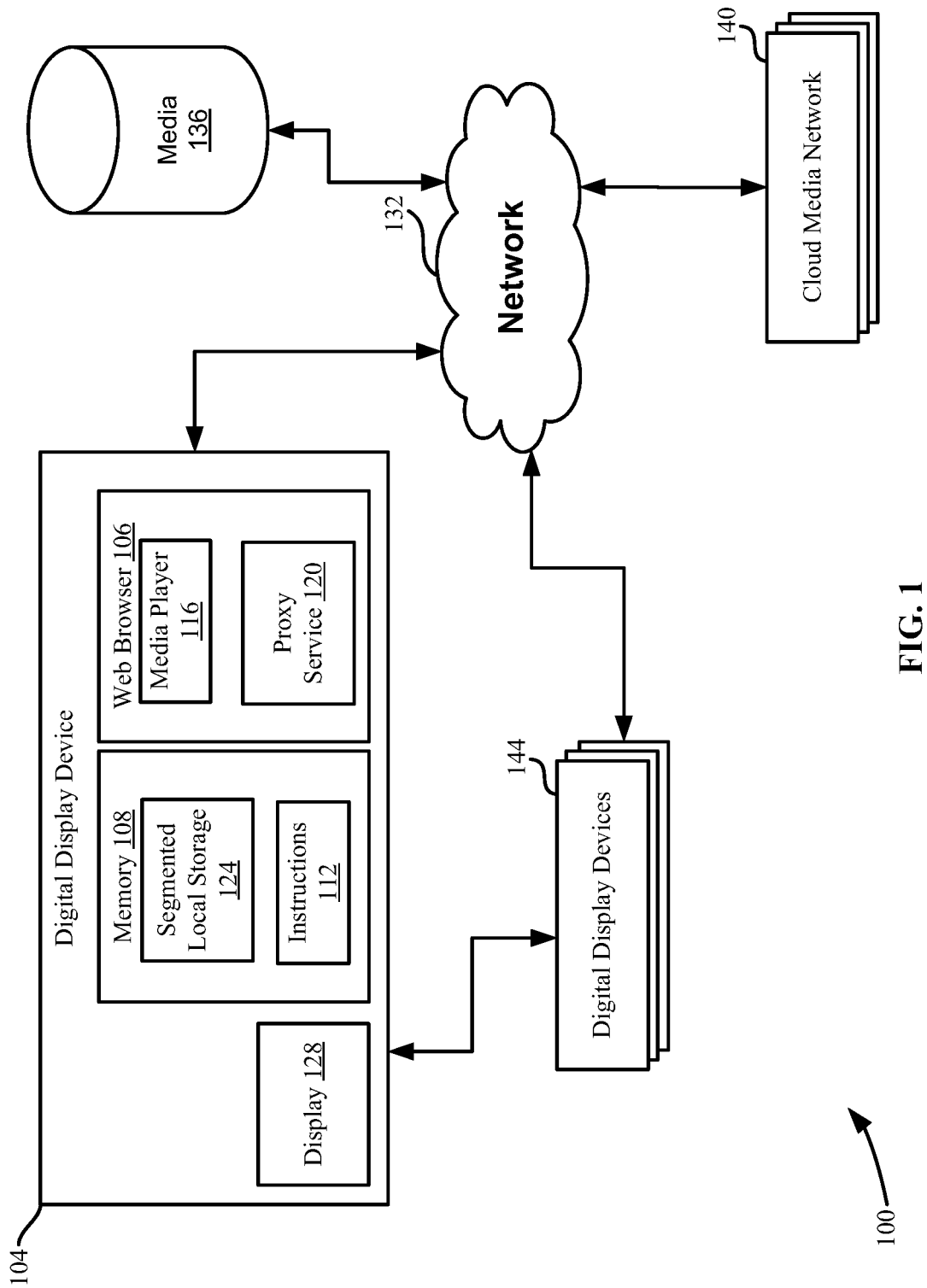
FIG. 1 depicts an example of a network environment in which a digital display device may operate, according to certain embodiments of the present disclosure.

The present disclosure involves generating and configuring a media player within a web browser of a digital display device. Certain embodiments described herein improve the performance and capabilities of digital signage devices and other digital display devices. A media player is loaded and executed within a web browser of a digital display device enabling the media player to execute on the digital display device (e.g., using the web browser) without being be installed within the digital display device. The media player causes a proxy service to execute. The proxy service intercepts network requests from the media player. If the digital display device is connected to the remote server from which media content is received, the proxy service can pass the network request on to the server. If the digital display device is not connected, the proxy service can service the network request locally, such that the media player can continue rendering media.

The following non-limiting example is provided to introduce certain embodiments. In this example, a digital display device includes processing hardware that can execute a web browser. A media player, as executed within the web browser, can display content for the digital display device. The media player is loaded from a media server (e.g., through a URL or the like) such that media player (or applications files of the media player) is not installed within a file system of the digital display device.

In this example, a proxy service executed on the digital display device facilitates switching between local content and content from a remote source. The proxy service, among other things, intercepts network requests transmitted by the media player and services those requests locally enabling the media player to operate offline. For instance, the media player transmits requests to the media server to display media content. The proxy service intercepts the request and determines if a copy of the requested media content is stored locally. If so, the local copy of the media content is loaded. If not, the proxy service retransmits the request to the media server. The digital display device's use of local content and content from a remote source as a secondary (fallback) source can allow the digital display device to maintain playback of content even when operating in locations with frequent interruptions in network connectivity.

To permit this interception, the media player registers the proxy service with a web browser. In response to the registration, the web browser passes network requests to or from the media player to the proxy service. If the network request is received from the media player, the proxy service determines if the network request should be redirected to local memory (e.g., an indexed database or the like) or retransmitted to a remote server. If the network request is received from the media server, the proxy service generally passes the request directly to the media player, though in some instances, such as when files are to be cached for local use, the network request (and any files therein) may be stored in local memory).

The media player registers with the media server, and in response, the media server returns access credentials to the media player. The access credentials enable secure communications between the media server and the digital display device. The media player passes the access credentials to the proxy service to enable the proxy service to access the media server directly. The access credentials can be unique to a particular digital display device or to a set of digital display devices (e.g., the digital display devices within a particular domain, such as a same restaurant). The access credentials are used to establish a trusted relationship between the proxy service on the digital signage device and the media server. For instance, the proxy service transmits, to the media server and on behalf of the media player, requests for content that are signed using the access credential, and the media server's responses to these requests can be signed using the access credentials.

Continuing with the example above, the media player can use the access credentials to request media content for playback by the media player on the digital display device. The media player receives the requested media content along with a rule set and stores the media content and rule set within a local database. The rule set includes one or more rules that configure particular playback of content, such as a time interval over which particular content is to be presented, order in which content is to be presented, etc. The service proxy service also requests application files of the media player from the media server. The proxy service stores the requested application files in a local database (e.g., the same database as used by the media player or a separate database). The media player loads the media content within the local database and initiates presentation of the media content according to the rule set. For instance, the media player is configured to play any type of media including, but not limited to, images, videos, audio, webpages, interactive applications such as web application, combinations thereof, and the like.

The downloaded rule set and application files allow the media player to continue playback of locally available content even if the digital display device is disconnected from a data network. For instance, the proxy service can intercept network requests and redirect the network requests to local storage locations accessible to the web browser, rather than the media player being notified of the network requests failing to reach a remote source. This interception and redirection allows the media player to operate in the same way as the media player does when connected to the media server.

Existing solutions for digital signage devices have a number of disadvantages. Downloading updates is often difficult or impossible due to the locations in which digital signage devices are typically deployed being subject to poor connectivity. For instance, digital signage devices are often placed inside buildings where the building materials and layout cause inconsistent network coverage. As a result, digital signage devices cannot reliably maintain a continuous connection to download new content. In most circumstances, the digital signage device operates "offline" in which media continues to be presented from memory.

In some embodiments, a custom configurable media player may be executed within a virtualized environment such as a web browser or virtual machine such that the custom configured media player may be executed within any particular hardware or software environment. For instance, the media player can execute within a process of the web browser rather than directly on the processing stack. In this instance, the web browser may act as a virtual environment that abstracts the particular hardware and software environments of the digital display device. The media player does not need to be specially adapted to the particular hardware or software environment and a result a same media player can execute on many different types of hardware devices.

The web browser may also execute a proxy service that can intercept network requests to enable the media player to continue operations as if connected to the network (e.g., during network inconsistencies, disruptions, or the like). The proxy service may redirect some network requests to local memory such as requests for media content. Media content can be downloaded in background processes where a batch update process can execute to update the media content. The batch update processes can include rollback support (e.g., returning to a previous state of the media content if either the download fails or the update fails), which may protect the integrity of the local memory due to the inconsistent network connection.

Example of an Operating Environment for Configuring Media Players

Referring now to the drawings, FIG. 1 depicts an example of a network environment for digital display device, according to certain embodiments of the present disclosure. Digital display devices can be any device configured to render and display media onto a display. An example of a digital display device includes digital signage devices, which are configured to present media on an attached display for extended time intervals within public locations. Typically digital signage devices operate in locations with limited or inconsistent network coverage and as such cannot rely on network connectivity for regular operations.

In the example depicted in FIG. 1, digital display device 104 receives configuration formation (e.g., application files, etc.) and media content for presentation by digital display device 104 from cloud-based media servers 140. Digital display device 104 includes memory 108 that stores software components of the digital display device. For instance, memory 108 includes instructions 112 that includes the instructions for executing web browser 106, controlling the operations of digital display device 104 (e.g., such as process scheduling, resource allocation, network requests, etc.), and the like.

Web browser 106 can be any software that is executable by the processing hardware of digital display device 104 to access content over the Internet via hypertext transfer protocols (e.g., HTTP and HTTPS). Web browser 106 renders the content for display by display 128 of digital display device 104. Web browser 106 can abstract the hardware of digital display device 104 to operate a virtual (e.g., native-neutral) environment from which another application executes. For instance, using the web browser media player 116 can execute regardless of the particular underlying hardware (or other software) included in digital display device 104. As a result, media player 116 may operate on any hardware platform that can execute a web browser 106.

Media player 116 can be a web-based application that executes within web browser 106 to render media content. The media player may be downloaded from a remote server such as cloud media network 140. Once downloaded, the web browser executes media player 116. Media player 116 then executes a communication request to cloud media network 140 to receive media content for display by digital display device 104. The media content may be streamed by media player 116 or stored within a memory allocated to web browser 106 or within memory 108. For instance, media player 116 stores the media content within a first partition of segmented local storage 124. Thereafter, media player 116 loads the media content from memory and renders the media content for display by display 128.

Web browser 106 also executes proxy service 120 (e.g., such as a service worker or the like). Proxy service 120 intercepts communications transmitted to or from web browser 106. In some instances, proxy service 120 intercepts only those network communications that are addressed to or transmitted from media player 116. In other instances, proxy service 120 uses a list that indicates particular network communications to intercept or to allow to reach the addressed destination. In still yet other instances, proxy service 120 intercepts all network communications. Media player 116 periodically requests content from cloud media network 140 such that if the network connection with network 132 is disrupted, media player 116 can become inoperative. Proxy service 120 intercepts these requests and redirects them to memory 108 where the media content may be stored to prevent media player 116 from becoming inoperative. In addition to managing network communications, proxy service 120 acquires and stores application files for media player 116 in memory 108. The proxy service 120 uses the application files to configure the operations of media player 116 (e.g., to enable media player 116 to render particularly formatted content) and to reload an instance of media player 116 (e.g., during a network interruption, when digital display device cannot download a new media player).

In some instances, the proxy service 120 call functions within an application programming interface (API) exposed by web browser 106 that stores the application files. In some instances, the API may be a cache API. Proxy service 120 calls functions of the API to store the application files within the first partition of segmented local storage 124 or to establish a second partition within segmented local storage 124 for the application files. Web browser 106 executes proxy service 120 in a separate process (or thread) from media player 116. The processing separation enables proxy service 120 to allocate a separate memory partition (e.g., the second partition) and manage network communications to and from the process that executes media player 116. Since the media player 116 and proxy service execute within separate processes (or threads), the media player 116 does not detect that requests to cloud network 140 are being redirected to local memory during network disruptions. Media player 116 continues to operate as if connected to the cloud media network 140 regardless of the actual network status. Proxy service 120 executes an inter-process communication (IPC) call (e.g., a function that passes communication or other data between processes or threads) to transfer information to and from media player 116 and to access (e.g., load) data from memory allocated to media player 116 (e.g., the first partition of segmented local storage 124).

Proxy service 120 requests application files and configuration files from cloud media network 140. The application files enable proxy service to reload an instance of media player 116 during a time interval in which network connectivity is interrupted. For example, if media player 116 crashes or the process stalls, proxy service 120 uses the application files to load a new instance of media player 116 with web browser 106. The configuration files (and application files) configure media player 116 to render particular media. For instance, media player 116 requests media content from cloud media network 140 and receives media of a particular file type that the media player is unable to render. Proxy service 120 uses the application files and configuration files to configure media player 116 to play media of that particular file type. For instance, the application files and configuration files can include particular codecs or other data that enable media player 116 to render media content received from cloud media network 140.

Memory 108 includes segmented local storage 124 which includes the first partition, the second partition, and optionally one or more additional partitions. Each memory partition may store data as a database (e.g., such as an indexed table or the like). As noted above, proxy service 120 and media player 116 operate access separate memory partitions. This may prevent a failed update or download in one partition from corrupting everything stored in the other partition. In some instances, the first partition and the second partition may be the same section of allocated memory such that both media player 116 and proxy service 120 have access to the information stored by media player 116 and proxy service 120.

Media player 116 stores media content for presentation by digital display device 104 in an indexed database in key-value pairs, where the key can be a file path within a file system of cloud media network 140 and the value can be a media formatted file such as a container file (e.g., MP4, MPEG-4, MKV, FLV/F4V, etc.), a BLOB (Binary Large Object), an arraybuffer, or the like. Proxy service 120 stores the application files and configuration files for media player 116 within a cache database (e.g., using Cache API). Alternatively, proxy service 120 stores the application files and configuration files in the same indexed database as media player 116 (e.g., as key-value pairs).

Media player 116 initiates playback of the media content on display 128 of digital display device. Display 128 may include any type of display suitable to present particular types of media content. Examples of displays for alphanumeric text include, but are not limited to, light-emitting diode displays, liquid-crystal displays, eggcrate displays, vane displays, and the like. The display may be any segment-based display (e.g., seven-segment displays for numerical content, fourteen or sixteen segment displays for alphabetic and other types of characters, and the like) or dot-matrix.

Digital display device 104 can connect to other digital display devices 144 through network 132, a local area network, or through an ad hoc connection. A digital display device may operate in a master/slave relationship with other digital display devices such that media content displayed by a master digital display device may also be presented on one or more slave digital display devices. The master digital display device may coordinate whether the displays are to be synchronized such that each frame of media content is displayed on all devices at the same time or if there is to be a delay between each displayed frame. For instance, a series of digital display devices can be positioned along a path and each digital display device can display a portion of media content so as to provide a unique display for users that move along the path.

The master digital display device can select the particular media content displayed by an individual digital display device. For instance, each digital display device can store multiple types of media content for display according to a particular rule set. The master digital display device issues commands to the slave digital display devices to render particular content from among the locally stored content. If the local content is not found, the particular rule set may be used to select the media content for that device. Alternatively, the master digital display device can distribute the media content to the digital display devices through the ad hoc or local area network connection. This may enable multiple digital display devices to obtain the appropriate media content even when network connectivity is inconsistent. As one device disconnected from cloud media network 140, another digital display device that has already received the media content can transmit the media content to the disconnected digital display device.

Cloud media network 140 includes two or more interconnected servers that manage the operations of digital display devices. Cloud media network may be a cloud-based network of servers (and/or other computing platforms) in which processing can be distributed among the one or more interconnected servers. In some instances, cloud media network 140 may be a single server with a distributed processing core (e.g., among a processing center or the like). Newly provisioned digital display devices, access cloud media network to receive media content to display, media player application files, configuration files, codecs, updates (to media content, media players, proxy services, etc.). Cloud media network 140 receives requests for media content to be rendered by digital display device 104. In some instances, cloud media network 140 can determine what media content is to be displayed by the particular digital display device (e.g., based on a profile associated with the digital display device). In other instances, digital display device 104 specifies the particular content requested and cloud media network 140 transmits the requested media content back to digital display device 104.

Cloud media network 140 services requests for media content either locally or by accessing the requested media content from media database 136. Media database 136 includes one or more interconnected databases of media content accessible by cloud media network 140 and digital display device 104 (and digital display devices 144). For instance, digital display device 104 can transmit a request for media content to cloud media network 140, cloud media network 140 can request the media content from media database 136. Alternatively, digital display device 104 can request the media content directly from media database 136. In some instances, media database 136 is operated locally (e.g., within a same local network as digital display device 104) such that digital display device 104 can request and obtain updated media content without relying on a connection with network 132. This may further prevent an inconsistent network connection from interfering with the operation of digital display device 104.

Network 132 can be any network that enables communications to pass between digital display device 104, digital display devices 144, cloud media network 140 and media database 136. Examples of network 102 include, but are not limited to, Internet, local area networks ("LAN"), wireless area networks, personal area networks, wide area networks, and the like.

As described in detail with respect to the various examples below, digital display devices generate and manage media players for cross-platform interoperable media presentation in occasionally-connected locations according to various embodiments. Although described with various levels of specificity, the media player executes in any particular hardware environment (e.g., cross-platform) while maintaining local instances of network content (e.g., application files, media content, etc.) for continuity of operation upon disconnecting from network sources. The operations described herein can be applied to any computing device that operates in occasionally-connected locations.

Figure 2:
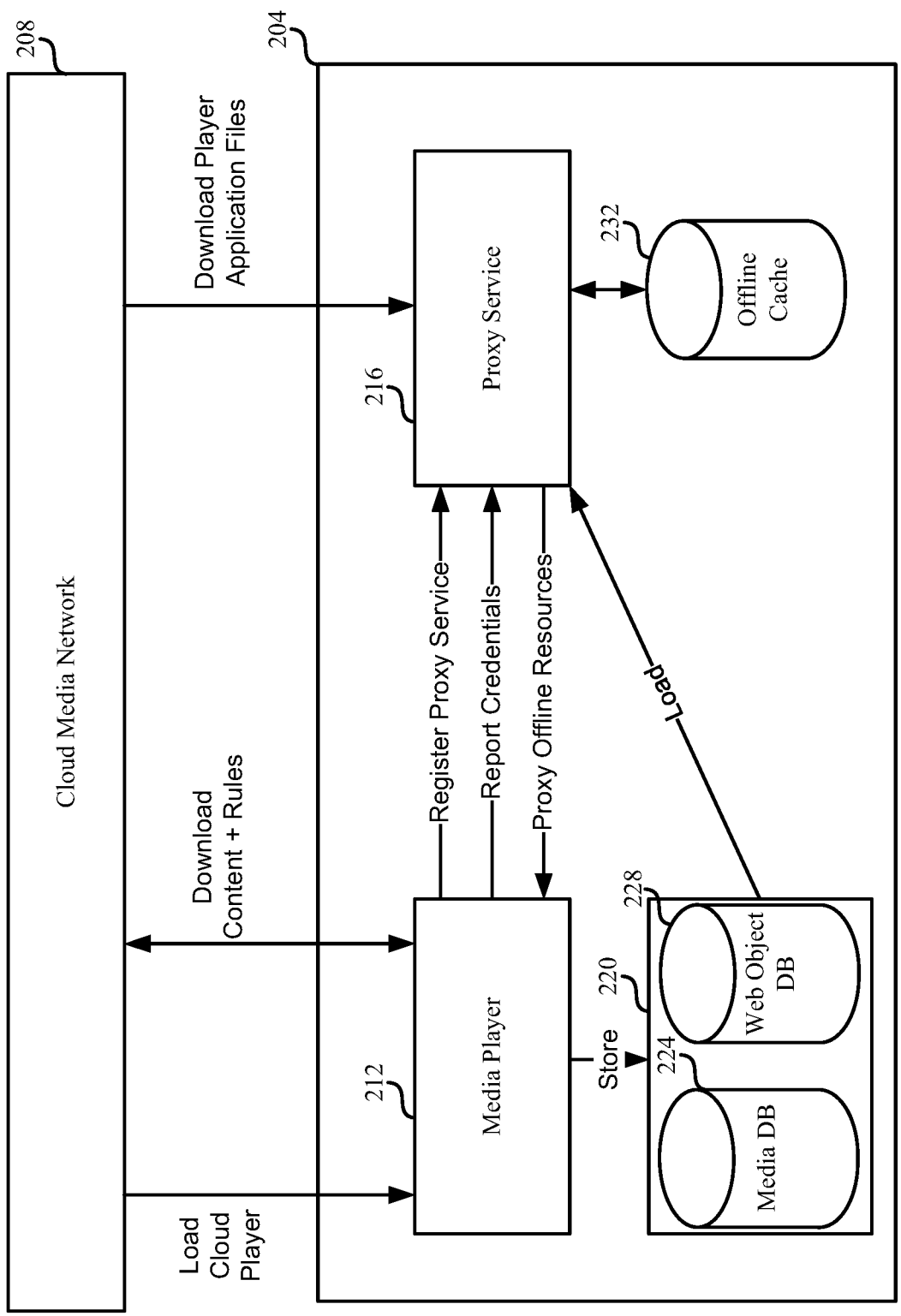
FIG. 2 depicts an example of a digital display device, according to certain embodiments of the present disclosure.

FIG. 2 depicts an example of a digital display device, according to certain embodiments of the present disclosure. Digital display device 204 operates within an occasionally-connected location in which the connection to cloud media network 204 is inconsistent and/or prone to disruption. For instance, digital display device 204 can operate within a restaurant or underground at a mass-transit station in which the location naturally impedes wireless reception digital display device 204.

The first time digital display device 204 is powered on, it attempts to connect to cloud media network 208 to provision a media player 212. Cloud media network 208 can include one or more servers in a distributed cloud network. For instance, cloud media network 208 manages media content, the set of rules, application files, confutation files, and the like for digital display devices within a particular domain (e.g., one or more digital display devices operated by a particular entity or within a particular location). Digital display device 204 may transmit a request (e.g., via HTTPS, remote procedure call, simple object access protocol, etc.) to cloud media network 208 to load an instance of media player 212. Cloud media network 208 responds to the request by transmitting a template version of media player (e.g., a generic version that is configured to present common media formats). Media player 212 may be native to cloud-based software environments and as such as is agnostic to the hardware environments of digital display device 204. Thus, cloud media network 208 may distribute a same media player to any particular hardware configuration of digital display device 204.

Digital display device 204 executes media player 212 as a stand-alone application or as a web-based application within a web browser. If media player 212 executes from a web browser, the web browser acts as a virtual environment that abstracts the hardware platform enabling the features of the media player. If the media player 212 executes as a stand-alone application, cloud media network 208 may transmit, container code and/or a virtual machine to generate an environment in which media player 212 may execute. Alternatively, digital display device 204 may include instructions for generating the virtual machine that generates the environment for media player 212.

Media player 212 generates an instance of proxy service 216 by registering the proxy service with the web browser. In some instances, digital display device 204 executes proxy service 216 within a same application (e.g., web browser, virtual machine, etc.) as the media player. However, digital display device 204 executes proxy service 216 as a separate process with the processing stack or as a separate thread within a same process as media player 212. In other instances, proxy service 216 may execute within the same process and thread as the media player 212 (e.g., the main process of the virtual machine, web browser, the media player 212, etc.).

Media player 212 then registers with cloud media network 208. In response, cloud media network 208 passes access credentials to media player 212. Cloud media network 208 generates access credentials that are unique to particular digital display devices. The unique access credentials prevent one comprised access credential from rendering the entire system accessible to a malicious device. The access credentials may be generated based on a unique characteristic of digital display device 204. For instance, access credentials may be generated from a hash of a physical address such as a media access control (MAC) address, a hardware fingerprint (e.g., generated based on a composite of one or more hardware components within digital display device 204), user account associated with digital display device 204, a user characteristics (e.g., a hash of a user name, or user specified alphanumeric string) or the like.

In some instances, media player 212 registers with cloud media network 208 before media player 212 registers proxy service 216 with the web browser (or other virtual environment). In other instances, media player 212 registers with cloud media network 208 in parallel with registering proxy service 216 with the web browser (or other virtual environment). In still yet other instances, media player 212 registers with cloud media network 208 after media player 212 registers proxy service 216 with the web browser (or other virtual environment).

Media player 212 then generates requests for media content for display by digital display device 204 and a set of rules. Cloud media network 208 obtains the requested media content (e.g., either locally within cloud media network 208 or from a remote database such as media database 136) and transmits the media content to media player 212 with a set of rules for controlling the playback of the media content. The set of rules can be triggered by operating conditions of digital display device 204 and/or characteristics of an environment within which the digital display device 204 is positioned (e.g., characteristics of such as time of day, geolocation, location relative to other digital display devices, location within a building, weather, season). For instance, a first rule may present particular content if it is hot such as content for staying cool in hot weather, and different content if it is raining. Another rule can indicate that particular content is to be displayed between the hours of 2:00 PM to 6:00 PM or that content is to be displayed for a particular time interval before transition to different content. Rules can be based on, but are not limited to, current time, time intervals, weather, traffic, temperature, season, update status, version, user profile, combinations thereof and the like.

Rules may be hierarchical such that a first rule can supersede another rule. For instance, a first rule indicates particular content to be displayed as a digital menu during lunch hours. A second rule, lower in the hierarchy from the first rule, indicates a particular time of 12:00 PM for requesting new content and updated application files for media player 212. Despite the conditions for both rules being satisfied, the first rule will be executed (e.g., the particular content will be displayed) and the second rule will be suppressed for a predetermined time interval. After the predetermined time interval, digital display device 204 determines if the rule is satisfied again. In some instances, after the predetermined time interval lapses, a suppressed rule moves up in the hierarchy by one position until the rule is executed at which point it returns to its original position within the hierarchy.

Cloud-native media player 212 stores the media content and set of rules in memory 220. Memory 220 can include one or more partitioned memory regions that span local and externally connected memory (e.g., through universal serial bus (USB), or network area storage device, or the like). Memory 220 stores media content and the set of rules as key-value pairs within one or more databases such as media database 224. The key can be a file path within a file system of the digital display device 204 and the value can be the media content file (e.g., in a blob format or a container file). Alternatively, memory can store the data using a different storage and/or in a different type of database such as a web object database 228 or another type of database, an indexed database, or the like. The local storage of media content enables offline playback by media player 212. In some instances, offline playback is facilitated by proxy service 216, which attempts to service the request for media content using local memory first and if that is not possible redirects the request to cloud media network 208. Alternatively, the uniform resource locators (URLS) that are used to request the media content may be modified to point to a local path. When cloud-based media player 212 executes a request that includes the URL, the URL will point to media content within local memory.

Proxy service 216 requests applications files that correspond to media player 212 from cloud media network 208 synchronously or asynchronous with media player's 212 request for media content. Proxy service 216 stores the application files in offline cache memory 232. Offline cache memory 232 can be a separate memory device from memory 220 so as to isolate the application files of media player 212 from the media content and the set of rules. This can prevent corruption within one memory location from affecting other memory locations. Alternatively, offline cache memory 232 can be a partitioned memory location within memory 220 or within media database 224.

Application files can include files that install media players (e.g., to enable digital display device 204 to instantiate a new instances of media player 212 during a period of network inactivity) and that configure media players to render particular types of media such as a codecs, display interfaces, and the like. For instance, since media player 212 operates for long, uninterrupted time intervals (days, weeks, etc.), there may be times when media player 212 must be reloaded (e.g., software faults, corruption, power outages, etc.) to continue operation. During these times, proxy service 216 loads a new instance of media player 212 using the local the application files rather than wait for network connectivity.

Digital display device 204 operates in occasionally-connected environments in which network connectivity with cloud media network 208 may be consistent or prone to disruption. In some instances, if network connectivity cannot be established, digital display device 204 can be provisioned using a local storage media (e.g., such as a USB storage device or the like).

During operation, digital display device 204 continuously transmits requests for content and/or updates to cloud media network 208 in the background (e.g., while displaying media content). Since the network connectivity may increase download times, requesting new content and application files while content is still being displayed, may prevent disruptions and system downtime. Downloads of new content and/or application files may include large sized files.

The files may be divided into chunks that can be downloaded in smaller sections. If the connection is disrupted before the download completes, the download can be resumed by downloading the subsequent chunk (and any chunk corrupted by the disrupted connectivity).

Digital display device 204 may use a local first, network second approach to content display in which media player 212 displays media content within memory 220 before requesting content from cloud media network 208. Proxy service 216 intercepts network requests from media player 212 and attempts to service the requests using memory 220 before retransmitting the request to cloud media network 208. Proxy service 216 loads the local content and passes it to media player 212. This can prevent the media player 212 process from stalling while waiting for a network response that may not arrive (e.g., due to network connectivity disruptions).

Figure 3:
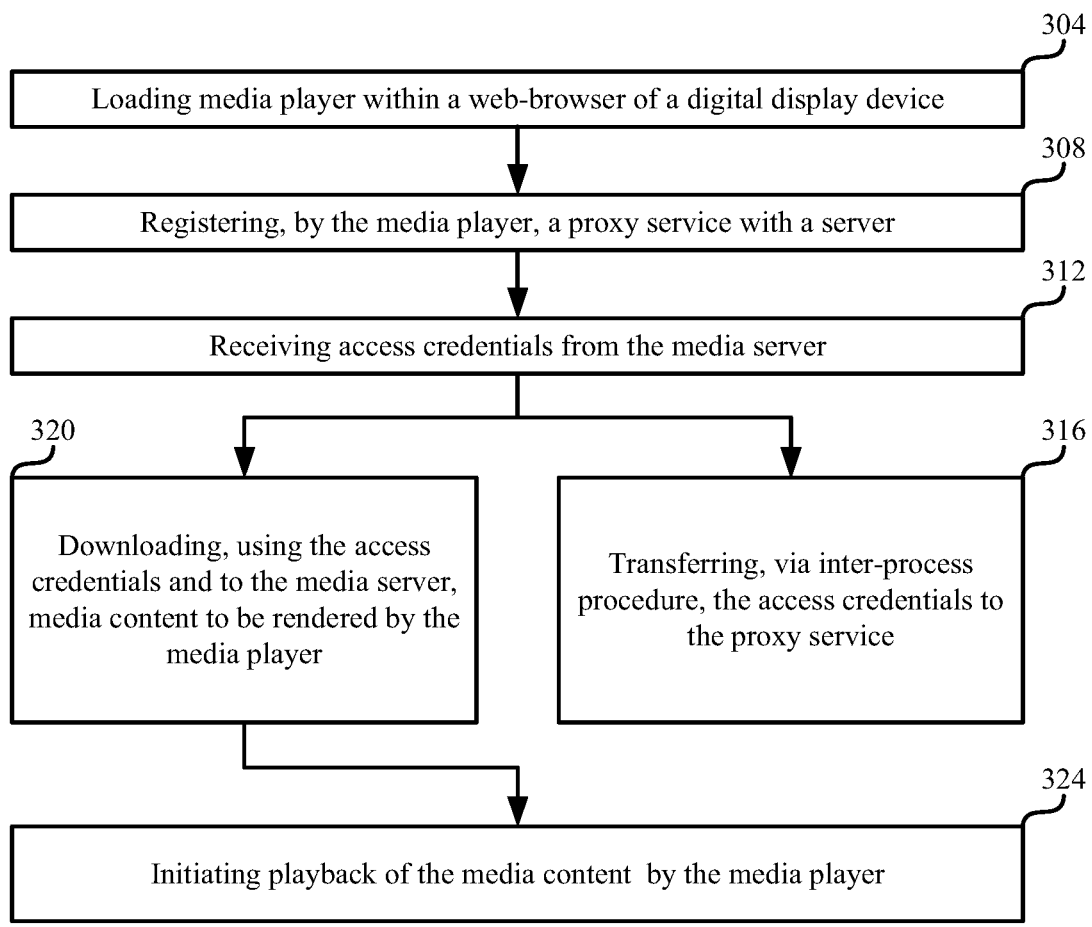
FIG. 3 depicts an example of a process for configuring a media player within a digital display device, according to certain embodiments of the present disclosure.

FIG. 3 depicts an example of a process for generating a media player within a digital display device, according to certain embodiments of the present disclosure. At block 304, a digital display device loads a media player with a web browser digital display device. Digital display device may load the media player from locally stored application files or may generate a request to a server such as cloud media network to load the media player. The server can load the media player with the web browser as a web application. The digital display device stores the functionality of the media player locally within the web browser executing the media player.

At block 308, the media player registers with the server and causes a proxy service to be registered with the web browser (e.g., the web browser's processing engine). The proxy service intercepts network requests from the media player to the server and determines whether to redirect the request to a local memory path. For instance, if network connectivity is disrupted, the proxy service will redirect the request to the local memory path. If network connectivity is available (and the quality or throughput of the connection exceeds a threshold), the proxy service may retransmit the network request to the server. The proxy service may generate entirely new network requests or modify the network request. For instance, the proxy service may receive a request for particular content via a particular uniform resource locator (URL) to the server. The proxy service redirects the request by replacing the URL with a local file path which may store the particular content (or different, but acceptable content). The proxy service loads the content from the local memory and returns the content to the media player such that the media player does not detect the network disruption and the functionality of the media server remains unaffected.

The proxy service may be separated from the media player so as to enable the interception of network requests. Proxy service may execute within a same application (e.g., the web browser), via a different application within a same device or stand-alone. If executing within a same device as the media player, the proxy service executes within a separate thread or process from the media player. If executing within a different application or stand-alone, the proxy service executes within a separate process from the media player. In some instances, proxy service may execute with a separate device that is positioned on a signal path between one or more digital display devices and an external network.

At block 312, the server transmits access credentials to the media player as a result of registering the media player with the server. The access credentials secure the communications between digital display device and the server (e.g., using encryption). For instance, once registered, communications between digital display device and the server use HTTPS over a secure sockets layer (SSL) or transport layer security (TLS). HTTPS encrypts the communications to prevent interception by a malicious device. Digital display device uses the access credentials to decrypt the communications from the server.

At block 316, the media player receives the access credentials from the server and passes them to the proxy service to enable the proxy service to communicate over the secure connection with the server. Since the proxy service executes within a different thread or process, passing data (or messages) between the media player and proxy service may be facilitated by inter-process communication (IPC) calls (e.g., using a socket, pipe, file messaging queue, or the like). Alternatively, the digital display device receives the access credentials and stores the access credentials within a central location (e.g., accessible to both the media player and the proxy service).

At block 320, the media server downloads media content using the access credentials for rendering by the media player. For instance, the media server may transmit a secured network request using the access credentials. The secured network request includes an identification of the particular media content for display by the digital display device. The server generates a secure response that can be decoded using the access credentials. The secure response includes the particular content and a set of rules of presenting the particular content. The set of rules can indicate how long the particular content is to be displayed before displaying other content, a particular time of day to render the particular content, what content is to be displayed if particular conditions are satisfied, combinations thereof, or the like.

Blocks 316 and 320 may be executed synchronously (e.g., in parallel) or asynchronously (e.g., in series or offset from each other).

At block 324, playback of the downloaded media can be initiated according to the set of rules on one or more display devices connected to the digital display device. The media player may render the media content for as long as the digital display device remains powered on or the set of rules (or a particular rule therein) is satisfied.

Figure 4:
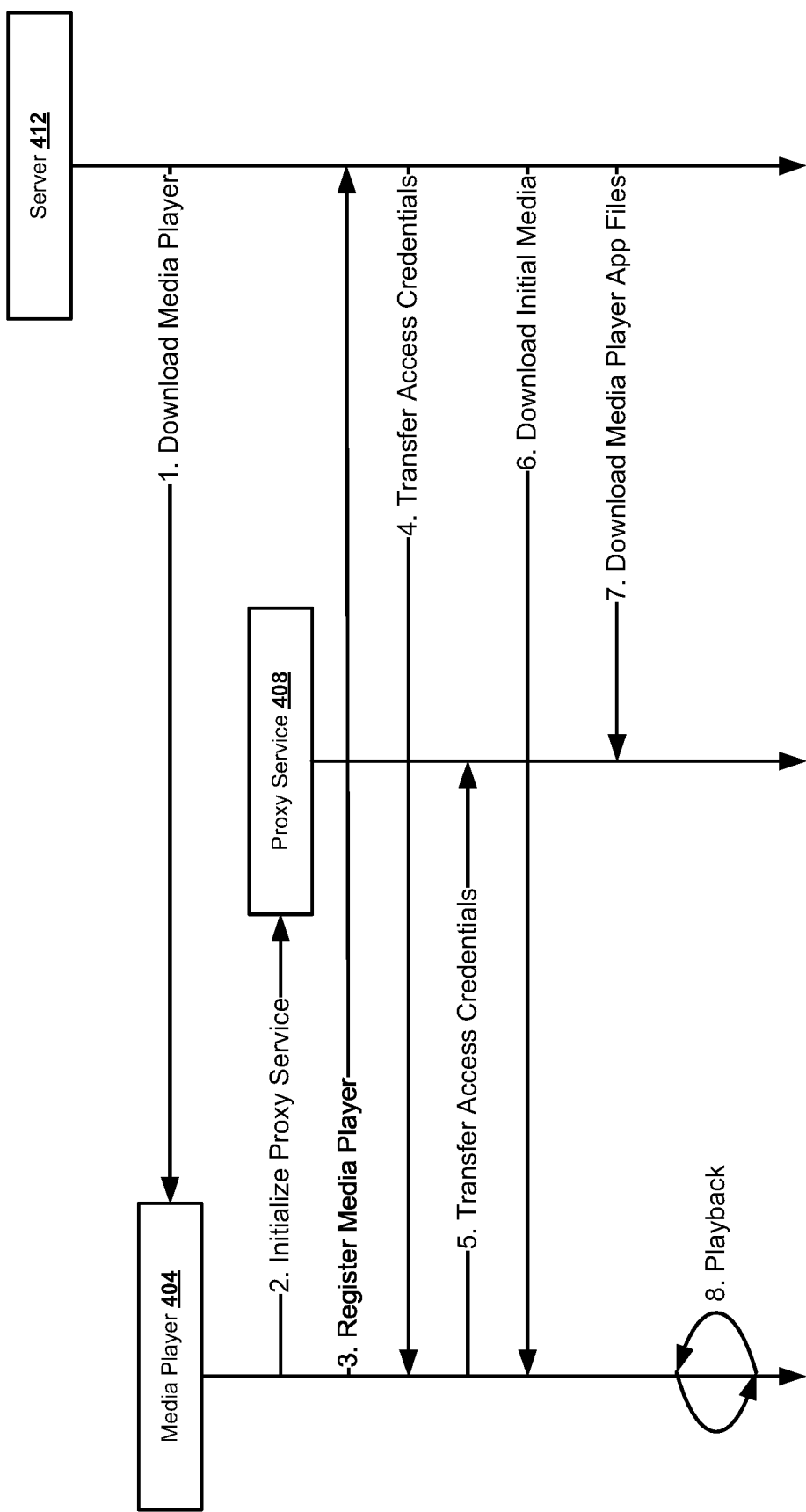
FIG. 4 depicts an example of a control flow graph for establishing a media player within a digital display device, according to certain embodiments of the present disclosure.

FIG. 4 depicts an example of a control flow graph for establishing a media player within a digital display device, according to certain embodiments of the present disclosure. The control flow graph represents the processing flow for generating an instance of media player 404 such as a media player. At step 1, the process initiates with a digital display device downloading an instance of media player 404. Media player 404 may operate as a stand-alone application or within a virtual environment established by another application (e.g., virtual machine, web browser, or the like).

At step 2, once the media player is executed by the digital display device, the media player initializes proxy service 408 by registering proxy service 408 with the virtual environment. Proxy service 408 may execute within the same virtual environment as media player 404, within a native environment of a same digital display device that executes media player 404, or externally from the device executing media player 404. If proxy service 408 executes from a different device, proxy service 408 may be positioned on a signal path between the digital display device executing media player 404 and the server 412 to enable proxy service 408 to intercept network requests to and from media player 404.

At step 3, media player 404 registers with server 412. By registering, media player 404, server 412 labels future requests received from the digital display device as being authorized. Server 412 can then process requests received from media player 404 and proxy service 408. Server 412 may also transmit requests received from external devices to the digital display device. For instance, when the receives new or updated content, or updates to the media player or other software of the digital display device are received, the server may transmit an update notification to the media players registered to server 412.

At step 4, the server transfers access credentials to media player 404 in response to registering media player 404. The access credentials enable secure, encrypted communications between media player 404, proxy service 408, and server 412. After transmitting the access credentials, communications between the digital display device and server 412 may occur in an encrypted protocol in which both server 412 and digital display device have the access credentials to decrypt the communications. The access credentials can be generated by server 412 based on unique characteristics of the digital display device such that the access credentials are unique to the digital display device. This may prevent compromised access credentials from granting access to the entire network of devices. Instead the compromised access credentials grant access to the particular digital display device.

At step 5, media player 404 generates an IPC to proxy service 408 that includes the access credentials. This enables proxy service 408 to communicate with server 412 now that the digital display device communicates with server 412 using encrypted communications.

At step 6, the media player downloads media content for playback by media player 404 and via a display device connected to, or embedded within, the digital display device. Media player 404 also downloads a set of rules that control how the media content is displayed. For instance, the set of rules can control when particular media content is displayed (e.g., during inclement weather, particular times of day, periods of high or low traffic, particular seasons, or the like), when media player 404 and proxy service 408 request updates or are updated, and the like.

At step 7, proxy service 408 downloads application files of media player 404. The application files include files that enable proxy service 408 to generate a new instance of media player 408. For instance, the digital display device may detect software faults in media player 404. Since the digital display device operates in an occasionally—connected environment, media player 404 may not be capable of reaching server 412 to download a new media player 404. Proxy service 408 uses the application files that are stored locally to reload media player 404. Application files also include configuration files for media player 404. The configuration files enable media player 404 to render particular types of media content. For instance, the configuration file can include particular application files that enable execution of file types, application files for identifying and executing file extensions, codecs, combinations thereof, and the like.

At step 8, media player 404 initiates playback of the downloaded media content according to the set of rules. For example, media player 404 generates a request to player particular content (according to the set of rules) by generated a request to the server 412. The request includes a uniform resource locator (URL). Proxy service 408 intercepts the request and determines if the key (e.g., the path indicated by the URL) has a corresponding value (e.g., the media content) within the local memory (e.g., the indexed database, the like). If so, the value is returned to the media player and the media player initiates playback. If there is no value that corresponds to the key, then the request is re-transmitted to the server 412. Alternatively, the media player 404, proxy service 408, server 412, web browser, or digital display device can modify the requests stored to replace the URLs with a local file system file path. When media player 404 generates a request for particular media content, the request will automatically access local memory rather than attempt to request the particular media content from server 412.

Figure 5:
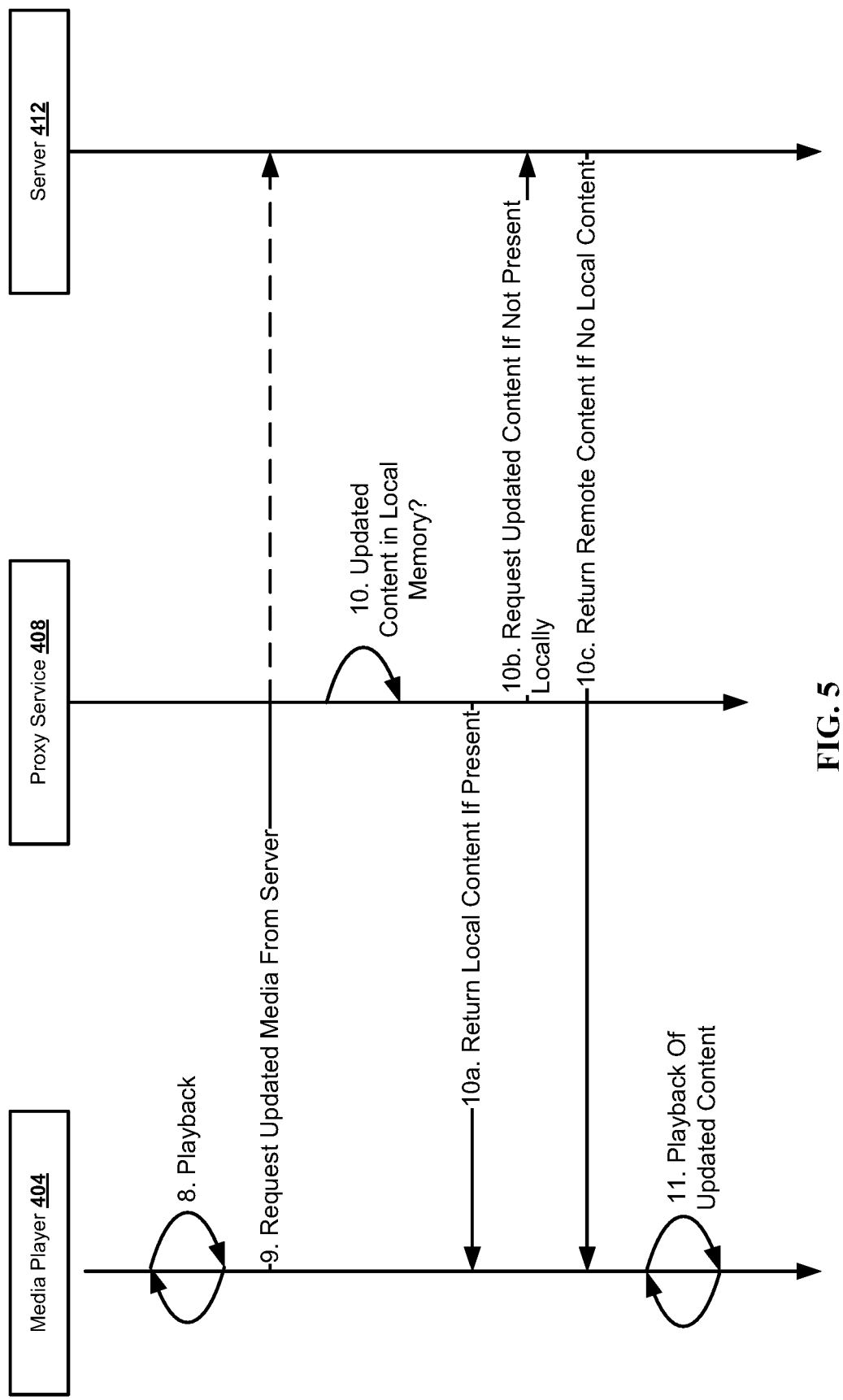
FIG. 5 depicts an example of a control flow graph for updating media content of a digital display device, according to certain embodiments of the present disclosure.

FIG. 5 depicts an example of a control flow graph for updating media content of a digital display device, according to certain embodiments of the present disclosure. The digital display device periodically updates the content rendered by media player 404 according to the set of rules. For instance, at step 8, media player 404 is continuing to render the downloaded media content. A particular rule within the set of rules can indicate that the downloaded media content is to be displayed only during the day. At sunset, media player 404 may terminate display of the first media content and the control flow continues.

At step 9, media player 404 requests updated media content from server 412. Proxy service 408 intercepts the request preventing the request from being transmitted to server 412. By intercepting the request, proxy service 408 prevents disruptions in connectivity from causing media player 404 to stall (e.g., waiting for a response from server 412 that may never be received). Proxy service 408 may use a whitelist to determine which requests to intercept and which requests are to pass through to server 412. For instance, requests for the next content to render are always intercepted (e.g., to default to local memory before a network request) and thus not appear on the whitelist. Requests for updated application files and other procedural requests will appear on the whitelist when these requests cannot be satisfied by local memory.

At step 10, proxy service 408 determines if the updated content is stored within local memory. Proxy service 408 attempts to satisfy requests for content using local memory first before requesting content from server 412.

If updated media content is found in local memory (e.g., the particular media requested, media of a same context, media approved for substitution, etc.), then at step 10a, proxy server 408 loads the updated media content from local memory and passes updated media content back to media player 404 as a response to the request at step 9. The response appears as if transmitted by server 412 such that media player 404 does not detect that proxy 408 intercepted and satisfied the response from local memory. Since the request was satisfied using local memory, proxy service 408 does not need to retransmit the request to server 412.

If updated media content is not found in local memory (e.g., the particular media requested, media of a same context, media approved for substitution, etc.), then at step 10b, proxy service 408 retransmits the request for updated content to server 412.

At step 10c, media player 404 downloads the remote media content from server 412. The remote media content includes the requested media content. Alternatively, the remote media content includes an acceptable variation from the requested media content. For instance, a set of rules may indicate whether the updated content must be selected or whether similar media content (e.g., such as media of the same type, same context, or the like) is an acceptable alternative. Server 412 attempts to service the request using the requested media content, but if the requested media content is not found, the similar media content may be transmitted back to media player 404 instead.

At step 11, media player 404 initiates playback of the requested media content (e.g., from step 10a or step 10c) according to the set of rules. Media player 404 may use the configuration files to enable execution of the updated media content.

Figure 6:
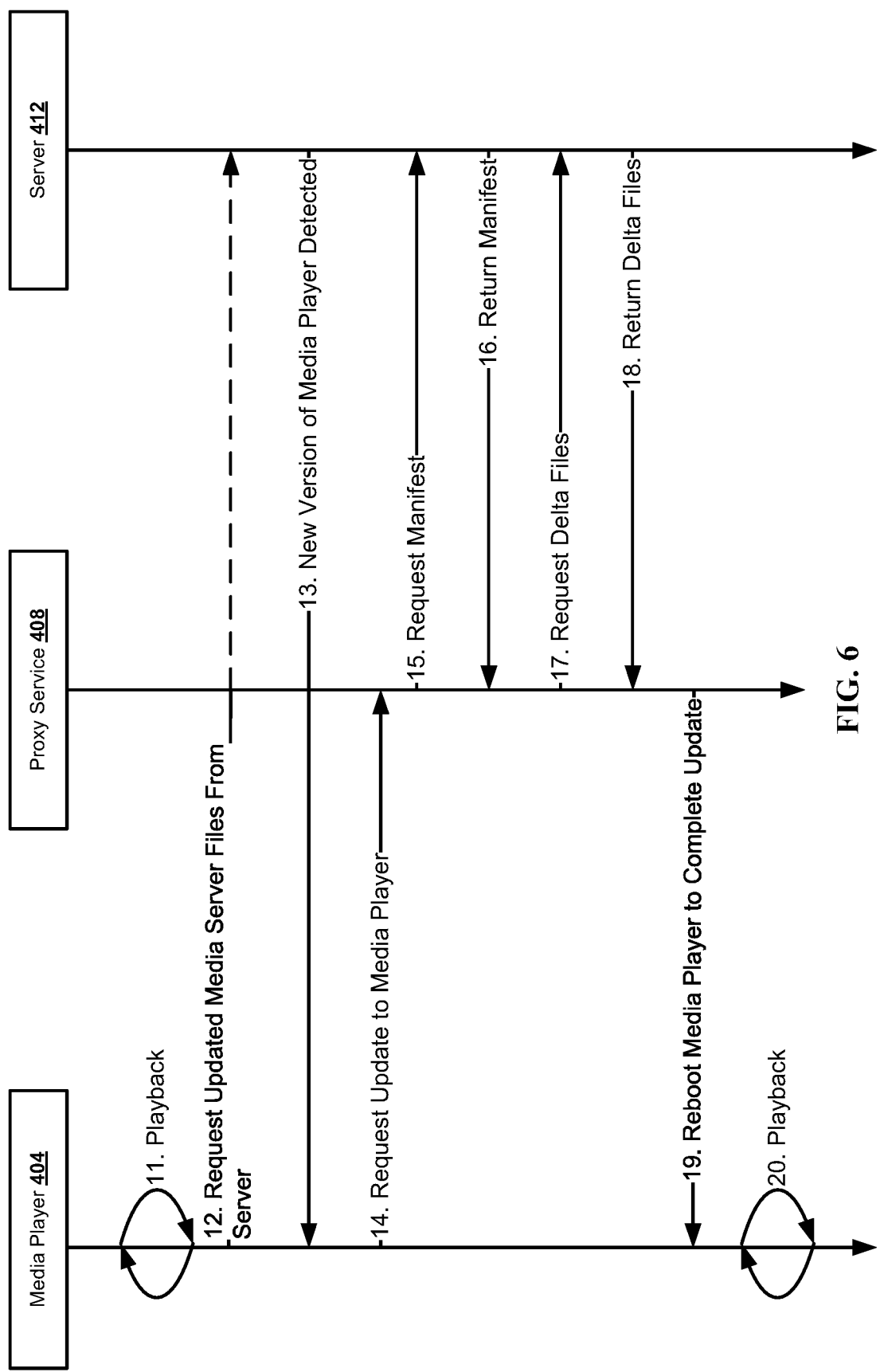
FIG. 6 depicts an example of a control flow graph for updating a media player within a digital display device, according to certain embodiments of the present disclosure.

FIG. 6 depicts an example of a control flow graph for updating a media player within a digital display device, according to certain embodiments of the present disclosure. The control flow graph depicts FIG. 6 steps that can occur after step 8 of FIG. 4 or after step 11 of FIG. 5. Media player 404 can be updated at any time including while media content is being updated according to the control flow of FIG. 5. Thus, the steps depicted in FIG. 6 can be executed after the steps of FIG. 5 (e.g., after step 11), before FIG. 5 (after 8 as presently depicted), or after any step of FIG. 5 (e.g., any step after step 8 and step 11). For instance, the steps of FIG. 6 can initiate after a step of FIG. 5 and either execute in whole (e.g., return to the subsequent step of the particular step of FIG. 5 after all of the steps of FIG. 6 executes) or the steps of FIG. 6 can execute throughout execution of FIG. 5 (e.g., in parallel with steps of FIG. 5 or between various steps of FIG. 5).

Returning to FIG. 6, at step 12, media player 404 transmits a request to server 412 to determine if there are updated application files for media player 404. Proxy service 408 intercepts the request to the server. Proxy service 408 searches the whitelist to determine if the requests for updated application files should be passed on to server 412 or should be satisfied by local memory. In some instances, requests for updated application files may be added to the whitelist to ensure the media server is able obtain the most recent version of media player 404. In other instances, proxy service 408 makes a determination based on the request and the operational status of media player. For instance, if a recent request for updated content was received and is passed on to server 412 and the operating status of media player 404 is acceptable, subsequent requests within a particular time interval may be suppressed by proxy service 408 to prevent wasting bandwidth that may be used to obtain updated media content or other processes of the digital display device.

At step 13, the server may transmit a response to media player 404 indicating whether there is an update for media player 404. The response may be formatted in an architecture-agnostic format such as JavaScript object notation (JSON) or a markup language such as extensible markup language (XML). If there is no update, the control flow passes directly to step 20 where media player 404 continues playback of media content on a display of a digital display device. If there is an update, the control flow continues at step 14 where media player 404 generates an IPC call to proxy service requesting proxy service 408 update media player 404.

At step 15, proxy service 408 requests an application file manifest from server 412. The manifest is a data file that lists application file identifiers and corresponding version identifiers such that proxy service 408 can determine the current version of the application files stored on server 412.

At step 16, server 412 returns the manifest to proxy service 408. Proxy service 408 then compares the received manifest against the application files and corresponding version identifiers stored in local memory. For instance, proxy service 408 can store the local application file identifiers and corresponding version identifiers within a local manifest file that can be compared to the manifest received from server 412 in a single process.

Proxy service 408 determines whether there is a difference (e.g., delta) between the manifest and the local manifest. If there is no difference between server's manifest and the local manifest, the process may terminate and return to playback at step 20. If there is a difference, proxy service 408 generates a delta file that includes identifiers for application files have updated version and corresponding version identifiers of the updated version.

At step 17, proxy service 408 transmits the delta file to server 412.

At step 18, server 412 returns the requested, updated files to proxy service 408. Proxy service 408 stores the updated files within local memory. In some instances, proxy service 408 replaces the previous version of the files with the updated version of the files. In other instances, proxy service 408 generates a snapshot of the application files and stores the snapshot in a separate file path. Then proxy service replaces the old version of the files. The snapshot enables proxy service 408 to revert to the previous version of media player 404 if the update fails. Proxy service 408 can store multiple previous versions of media player 404 enabling reversion to any past version of media player 408.

At step 19, proxy service transmits an IPC call to media player 404 requesting the media player to reboot. During loading, media player 404 loads the newer version of application files stored by proxy 408 in place of the previous version thereby completing the update. In some instances, when media player 404 loads, media player 404 may transmit a network request to server 412 for the application files. Proxy service 408 can intercept the request and redirect the request to the updated application files. The updated application files are transmitted to media player 404 allowing media player 404 to complete the loading process.

At step 20, media player 404 initiates playback of media content on the display of the digital display device.

Though playback of media content is depicted as a discrete step (e.g., steps 8, 11, and 20), playback may continue while one or more of the steps of FIG. 5 and FIG. 6 execute. For instance, in FIG. 6 playback of media content can continue during steps 12-18. At step 19, the media player reboots and no media content may be displayed until the media player completes the reboot. In FIG. 5, playback of media content continues throughout step 9-10c only pausing momentarily after step 10c to switch playback to the updated content.

Figure 7:
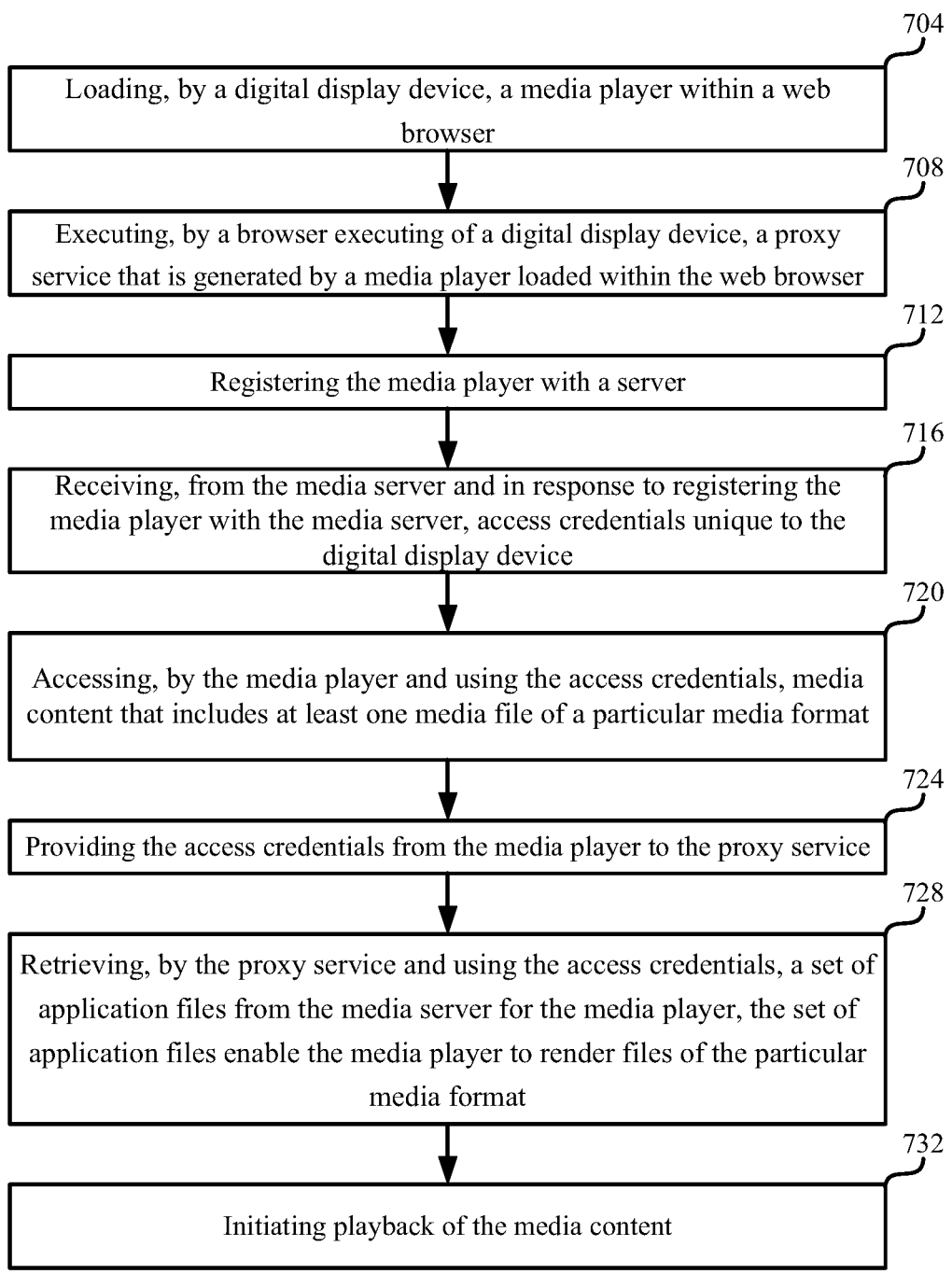
FIG. 7 depicts an example of a process for initiating playback of media within a digital display device, according to certain embodiments of the present disclosure.

FIG. 7 depicts an example of a process for initiating playback of media within a digital display device, according to certain embodiments of the present disclosure. At block 704, a media player may be loaded within a web browser executing within the digital display device. For example, the web browser executes a request, via a URL, to a cloud media network to load an instance of the media player within the web browser. The cloud media network then loads an instance of the media player within the web browser (e.g., by transmitting, code, scripts, etc. to be executed by the web browser). Since the instance of the media player is loaded from the cloud media network within the web browser, the application files of the media player are not installed within the digital display device.

At block 708 a media player of a digital display device may initiate execution of a proxy service by registering the proxy service with the web browser. The proxy service can be a standalone application that executes within the digital display device or a set of software functions that are executed within a process of the web browser. In some instances, the proxy service executes separately from the media player such as in a separate process of the web browser or within the same process that executes the media player, but within a separate thread.

At block 712, the media player may transmit a registration request to a server such as a cloud media network. The registration request can include an identifier of the media player and an identifier of the digital display device. The server may store the identifier of the media player in association with an identifier of the digital display device, media player, user account, combinations thereof, or the like. Registering the media player enables the media player to communicate securely with the cloud media network.

At block 716, the media player may receive access credentials from the cloud media network. After receiving the access credentials, the media server communicates with the digital display device using secure, encrypted communications. Secure communications may be facilitated by a secure communication protocol such as HTTPS over SSL or over TLS or by simply encrypting messages transmitted between the cloud media network and the digital display device by, for example, a symmetric-key or public-key encryption technique. The access credentials enable the digital display device to encrypt and decrypt future communications with the cloud media network. The media player passes the access credentials to the proxy service to enable the proxy service to communicate directly with the cloud media server.

The access credentials may be generated using unique characteristics of the digital display device (e.g., hardware fingerprint, user account associated with the digital display device, a software fingerprint such as a composite of one or more identifiers associated with executing processes or applications, combinations thereof, or the like). Generating access credentials that are unique to the digital display device enables the cloud media network to prevent malicious devices from accessing the cloud media network and other digital display devices. For instance, if a device other than the digital display device attempts to communicate with cloud media network using the access credentials of the digital display device, then the cloud media network determines that the device is not authorized and is likely malicious. The access credentials will be suspended to prevent further intrusion attempts and new access credentials can be issued to the digital display device. In some instances, the digital display device may be prevented from accessing the cloud media network to preserve the integrity of the cloud media network and other digital display devices from the malicious device.

At block 720, the media player may access media content to be rendered by the media player and displayed by a display of the digital display device. Accessing the media content can include accessing the media content locally (e.g., with memory accessible to the media player or the web browser and that is within the digital display device) or generating a request to the server. For instance, the media player transmits a request for media content to the server with the access credentials. In response to the request, the server provides the requested media content for download by the media player. The media content includes one or more media files, each media file being of a particular media format. For instance, each media file includes data encoded using a particular compression format (e.g., H.264, MPEG-4 Part 2, Advanced Audio Encoding (AAC), Continuous Media Markup Language (CMML), etc.) and packaged into a container file (e.g., MP4, MKV, TIFF, FLV, F4V, etc.) is represented by a file extension of the file type.

The media player may also download a set of rules that control playback of the media content. For instance, the set of rules can indicate when particular media content is to be displayed such as time of day, weather conditions, traffic condition, etc. The set of rules includes any rule that can be used to select media content for playback from among two or more possible media files based on a context of the digital display devices external environment (e.g., time, location, weather, combinations thereof, or the like) or media player (e.g., uptime, connection status, combinations thereof, or the like). The media player stores the downloaded media content and the set of rules in local memory such as an indexed database or web object database.

At block 724, the media server may pass the access credentials to the proxy service to enable the proxy service to communicate directly with the cloud media network. For instance, the proxy service intercepts some communication requests to the server from the media player and determines whether those requests are to be passed on to the cloud media network. The proxy service uses the access credentials to retransmit the request to the cloud media network (of the request is authorized). The proxy service may use a whitelist that stores request identifiers of network requests that are authorized to be passed on to a remote resource such as the cloud media network. The proxy service can learn from communications transmitted to and from the digital display device particular requests that should or should not be authorized. The proxy service can periodically add or remove entries in the whitelist.

In some instances, the media player passes the access credentials to the proxy service using an inter-process communication call. In other instances, the media player generates a cookie that stores the access credentials. The media player stores the cookie within the web browser. The proxy service then accesses the cookie from the web browser to obtain the access credentials.

At block 728, the proxy service, using the access credentials, may retrieve application files from the cloud media network. For instance, the proxy service transmits a request for the application files to the cloud media network. Alternatively, the cloud media network automatically transmits the application files after the media player registers with the cloud media server. In that case, the proxy service retrieves the application files from a local memory. The application files include files configured to generate an instance of the media player and configuration files. For instance, if the media player crashes when network connectivity is disrupted, proxy service can load a new instances of the media player from local memory and the operation of the digital display device can continue. The proxy service uses the configuration files to configure the media player to execute particular types of content media (e.g., particular formats, encodings, or the like) or to render particular content in a particular way (e.g., contrast, brightness, aspect ratios, frame rates, etc.).

At block 732, the media player may initiate playback of the media content using the application files and according to the set of rules. Since the media content is stored locally, disconnecting from the cloud media network does not interfere with the playback of the media content. Playback of the media content continues until the media player, the cloud media network, or the proxy service initiates an update procedure (e.g., update the content being displayed, the media player, the proxy service, etc.).

Figure 8:
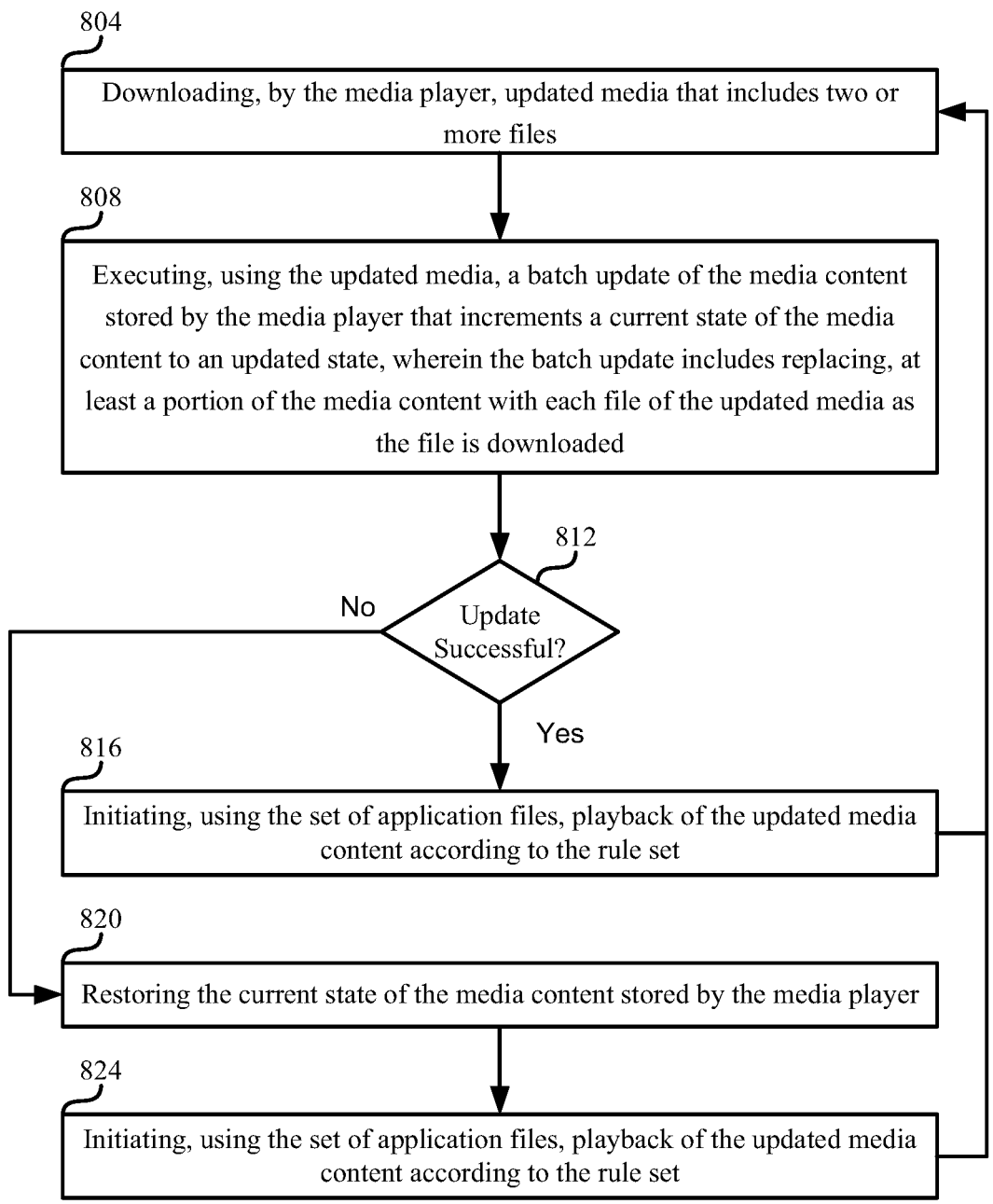
FIG. 8 depicts an example of a process for failsafe updating content within a digital display device, according to certain embodiments of the present disclosure.

FIG. 8 depicts an example of a process for failsafe updating content within a digital display device, according to certain embodiments of the present disclosure. Content is distributed to the digital display device over a network. The digital display device may be located in areas with poor network connectivity that cause frequent disconnects, low throughput, frequent dropped packets, etc. Updating content within such an environment can be error prone as incomplete updates can corrupt the media content stored on local memory preventing the digital display device from continued operation.

At block 804, the media player may begin downloading updated media. The updated media includes a set of files and a corresponding updated set of rules for the set of files. The files can be downloaded in series or in parallel.

At block 808, the media player may execute a batch update (e.g., updating a set of media files in one update process). During the batch process once a file is updated, the version identifier associated with the file is incremented to reflect the updated version. The batch process executes during the download process updating each file as the download completes for that file. Batch process may succeed or fail as a whole such that if even one media file fails to download or update, the entire batch process fails. This provides added security that a failed update does not damage the local memory storing content media.

At block 812, the media player may determine if the download and update completed successfully. The media player may analyze the downloaded file integrity using a cyclic redundancy check (CRC) or the like and then determine if the local memory associated with the media player includes the updated media files.

If the update was successful, then the process continues to block 816 where the media player initiates playback of the updated media content according to the set of rules (or if received, the updated set of rules). The media player continues to play the media content until the media player requests additional updated media content at which point the process returns to block 804 where a new set of media files can be downloaded. The process may continue indefinitely while the digital display device is powered on or until the media player is updated (e.g., see FIG. 9 below).

If the update was not successful (e.g., the connection was terminated before the download completed, a file fails the CRC analysis, etc.) the process continues to block 820 where the local memory regions reverts to a pre-update state. The media player stores media files within an indexed database in the local memory. The database stores the media files as key-value pairs in which the key is the file system path of the file and the value is the file (in a particular format such as a BLOB). Downloaded files are added to the database by appending the database table with the key/value pair. If the batch process completes successfully, the media player removes the older media files that are no longer needed from the database table. Reverting to the pre-update state includes removing any of the downloaded media files from the database table. Since the batch update failed, the media content that was stored prior to the update remains in the database.

At block 824 the media player may initiate playback of the (un-updated) media content according to the set of rules. The media player continues to play the media content until the media player requests additional updated media content at which point the process returns to block 804 where a new set of media files are downloaded. The process may continue indefinitely while the digital display device is powered on or until the media player is updated (e.g., see FIG. 9 below).

Figure 9:
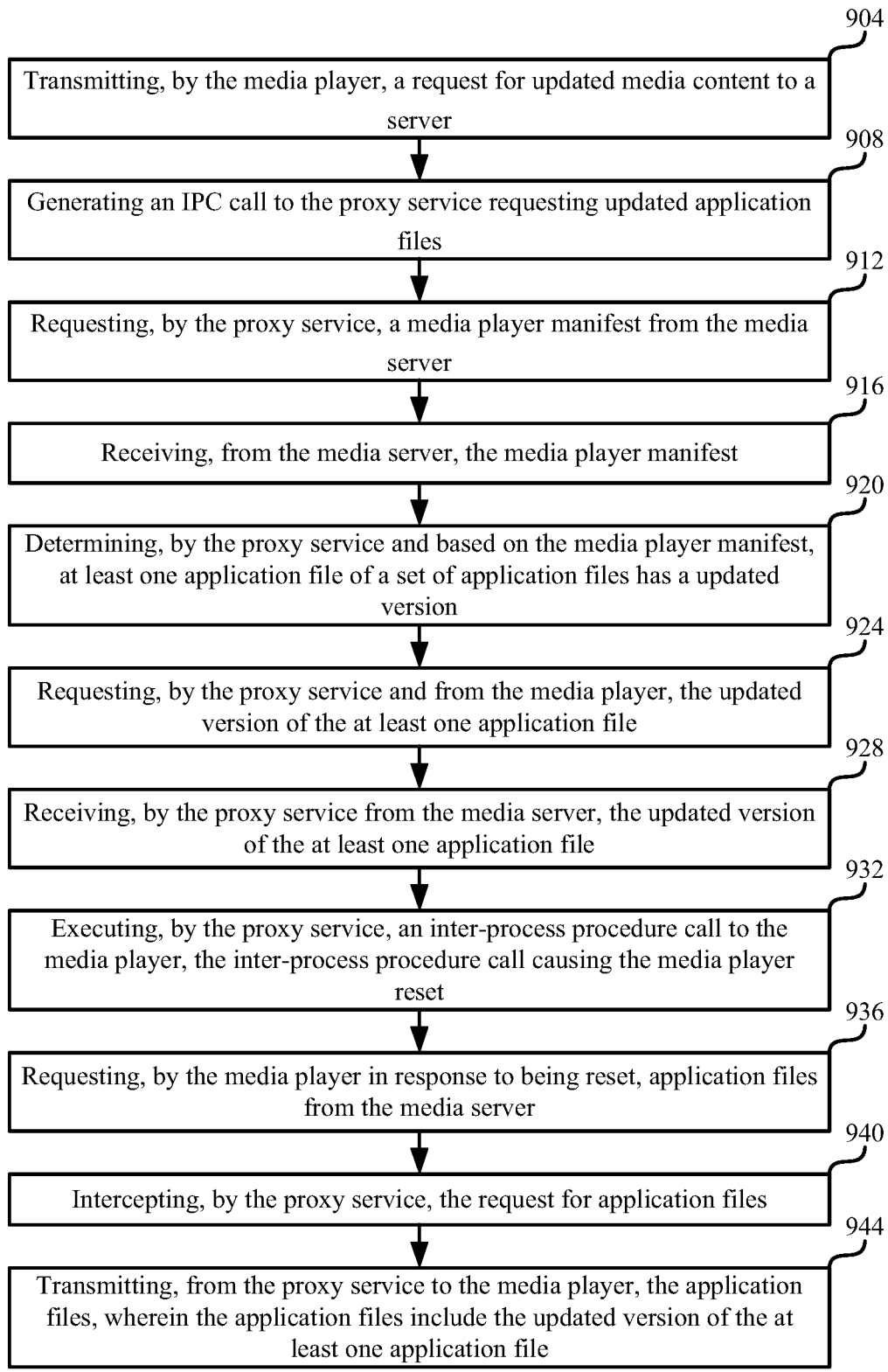
FIG. 9 depicts an example of a process for updating digital display device, according to certain embodiments of the present disclosure.

FIG. 9 depicts an example of a process for updating a media player of a digital display device, according to certain embodiments of the present disclosure. At block 904, the media player transmits a request to a server for updated media content. The server transmits a response indicating that there is a new version of the media player. In some instances, the response can include the updated media content (updated according to the process of FIG. 8 for example). In other instances, the request does not include the updated media content. Once the server reports the updated version of the media player, the media player determines whether to obtain the updated media content (and update the media player later) or proceed with updating the media player. The response from the server is in a platform-neutral format such as JSON, XML, or the like.

At block 908, the media player may transmit an IPC call to the proxy service to obtain the updated files for the media player.

At block 912, the proxy service may request a media player manifest from the server. The media player manifest includes a list of application file identifiers and corresponding version identifiers that are included within the updated version of the media player.

At block 916, the proxy service may receive a media player manifest.

At block 920, the proxy service may determine whether at least one application file of a set of application files of the media player has been updated by comparing the version identifiers of the manifest file with the version identifiers of the corresponding application files stored in local memory. The proxy service generates a delta file that includes each application file within local memory for which an updated version is specified by the manifest.

At block 924, the proxy service may transmit a request for updated application files. For instance, the proxy service includes in the request the delta file that indicates the application files that need to be updated to increment the version of the media player. The request can include a particular version identifier of each requested file. This may be used to request a particular version of a media player as well as the newest version of the media player. For instance, if the current version of the media player is unstable, the proxy service can request the version of the application files of the previous version of the media player.

At block 928, the proxy service, in response to transmitting the request for the updated application files, may receive the updated application files from the server. The proxy service stores the updated application files with a local database (e.g., separate from the indexed database that stores the media content). The local database may be structured similar to the indexed database so as to allow for batch updating and rollback as described in connection to FIG. 8. Alternatively, proxy service can use an exposed API of the web browser for local storage such as cache API or the like.

At block 932, the proxy service may execute an IPC call to the media player indicating that the updated application files are ready to be installed. In some instances, the IPC call causes the media player to reset. In other instances, upon receiving the IPC, the media player determines whether to reset. For instance, the set of rules defines the rules for both playback of media and performing updates. A first rule, for example, can indicate that playback is to occur between 4:00 PM and 12:00 AM. A second rule (lower in the hierarchy) indicates that if no other rules apply and an update is pending, then execute the update. If the rule is not satisfied (e.g., it is earlier than 4:00 PM or after than 12:00 AM), then the update commences. If the rule is satisfied, the media player continues playback of the media content according to the rule and commences the update once the rule is no longer satisfied (e.g., after 12:00 AM).

At block 936, as the media player may load after the reset, the media player transmits a request for application files to complete the loading process. For instance, the media player may not be capable of loading without being connected to the server. Since the digital display device operates in an occasionally-connected environment, the connection with the server cannot be relied on to reload the media player. The media player's request can be intercepted by the proxy service to prevent the reset from causing digital display device to crash waiting for a connection with the server.

At block 940, the proxy service may intercept the request for application files addressed to the server and redirects the request to local memory where the updated application files are stored.

At block 944, the proxy service may transmit a response to the media player's request for the application (e.g., via an IPC call or the like). The response includes the updated application files stored in local memory by the proxy service. The media player is then loaded within the web browser using the updated applications. Once the media player is loaded, the update is complete as the media player matches the newest version (or the version indicated by the version identifiers of the application files).

The updated media player may then resume normal operations. The media player transmits a request for content to the server. The proxy service intercepts this request and attempts to redirect the request to local memory (e.g., the indexed database) before retransmitting the request to the server.

The blocks of FIGS. 3 and 7-9, though presented in a particular order, may be executed in any particular order and each block may be executed one or more times before moving on to the next block. In addition, the processes of FIG. 8 and FIG. 9 can execute in parallel (with either process executing first) or in parallel with both process executing at approximately the same time.

Example of a Computing System for Implementing Certain Embodiments

Figure 10:
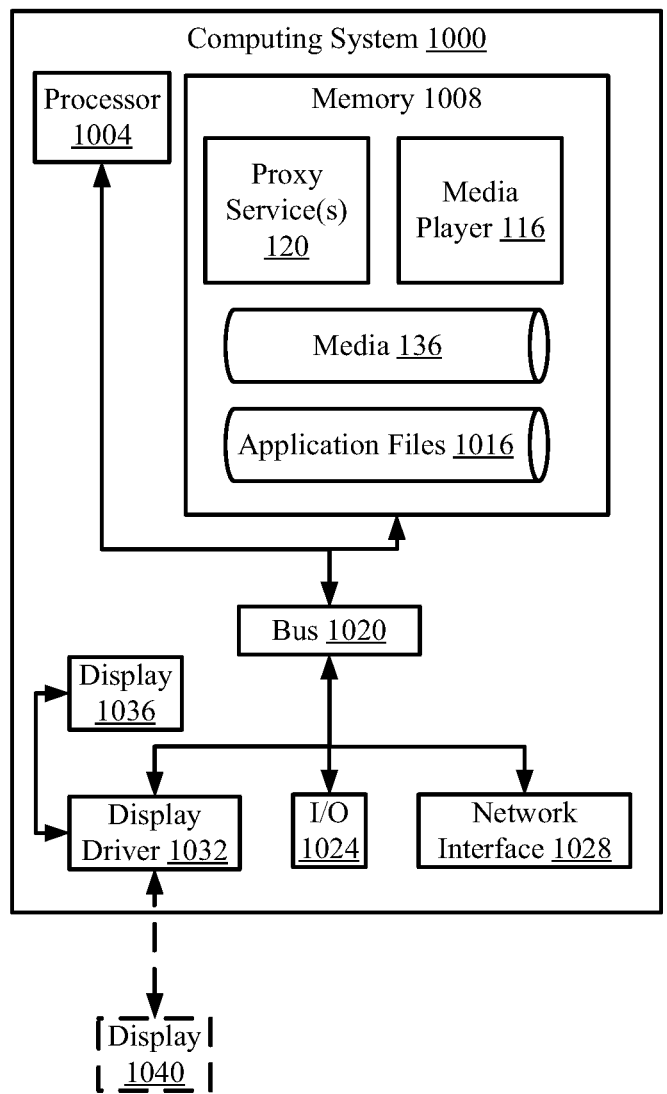
FIG. 10 depicts an example of a computing system that performs certain operations described herein, according to certain embodiments of the present disclosure.

Any suitable computing system or group of computing systems can be used for performing the operations described herein. For example, FIG. 10 depicts examples of computing system 1000 that operates as a digital display device such as a digital signage device. In some embodiments, the computing system 1000 generates media player 116 that is used to display media content for indefinite time intervals in an occasionally-connected environment, as depicted in FIG. 10. Computing system 1000 also generates proxy services 120 and manages local storage databases that include media database 136 and application files 1016. In some instances, media database 136 and application files 1016 are stored in the same database. In other instances, the media database 136 and application files 1016 are stored in different databases in the same memory partition or within a different memory partition (or a different memory device).

The depicted example of a computing system 1000 includes a processor 1004 communicatively coupled to one or more memory devices 1008. The processor 1004 executes computer-executable program code stored in a memory device 1008, accesses information stored in the memory device 1008, or both. Examples of the processor 1004 include a microprocessor, an application-specific integrated circuit ("ASIC"), a field-programmable gate array ("FPGA"), or any other suitable processing device. The processor 1102 can include any number of processing devices, including a single processing device.

The memory device 1008 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1000 may also include a number of external or internal devices, such as input or output devices. For example, the computing system 1000 is shown with one or more input/output ("I/O") interfaces 1024. An I/O interface 1024 can receive input from input devices or provide output to output devices. One or more buses 1012 are also included in the computing system 1000. The bus 1012 communicatively couples one or more components of a respective one of the computing system 1000.

The computing system 1000 executes program code that configures the processor 1102 to perform one or more of the operations described herein. The program code includes, for example, the media player 116, proxy service 120, web browser, or other suitable applications that perform one or more operations described herein. The program code may be resident in the memory device 1008 or any suitable computer-readable medium and may be executed by the processor 1004 or any other suitable processor. In some embodiments, the program code can execute in a cloud environment where a portions of the program code are executed by multiple devices in parallel.

The computing system 1000 accesses application files 1016 and media database 136 in any suitable manner. In some embodiments, some or all of one or more of these datasets, models, and functions are stored in the memory device 1008, as in the example depicted in FIG. 10. For example, computing system 1000 executes media player 116 using application files 1016 to render media content stored with media database 136 all of which can occur within memory 1008.

The computing system 1000 includes a network interface device 1028. The network interface device 1028 includes any device or group of devices suitable for establishing a wired or wireless data connection to one or more data networks (e.g., a local area network or wide area network (wired or wireless using Bluetooth, ZigBee, Wi-Fi, or the like), a cellular network, combinations thereof, or the like). Non-limiting examples of the network interface device 1028 include an Ethernet network adapter, a modem, and the like. The computing system 1000 is able to communicate with one or more other computing devices via a data network using the network interface device 1028.

The computing system 1000 includes display driver 1032 that may provide an interface with a display device that presents media content. For instance, the display driver 1032 can be graphical processing unit (GPU) or the like. The connected display device 1036 can be built in to computing system 1000 such that additional cabling and/or device may not be necessary to display content. Alternatively or additionally, the display driver connects one or more external display device 1040 for presentation of the media content by media player 116.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
loading, by a digital signage device, a media player within a web browser, wherein the media player is not installed within a file system of the digital signage device;
initiating, by the media player of the digital signage device, execution of a proxy service by registering the proxy service with the web browser;
registering the media player with a media server;
receiving, from the media server and in response to registering the media player with the media server, access credentials unique to the digital signage device;
accessing, by the media player and using the access credentials, media content that includes at least one media file of a particular media format;
providing the access credentials from the media player to the proxy service;
retrieving, by the proxy service and using the access credentials, a set of application files from the media server for the media player, the set of application files enabling the proxy service to load a new instance of the media player during a network interruption; and
initiating playback of the media content.

2. The method of claim 1, further comprising:
generating a request for updated media for playback by the media player, the request being addressed to the media server;
intercepting, by the proxy service, the request for the updated media based on a comparison of the request to a white list of requests; and
redirecting the request to a database.

3. The method of claim 1, further comprising:
commencing, by the media player, a download of updated media, the updated media including a first file and a second file;
executing, using the updated media, a batch update of the media content stored by the media player, wherein the batch update increments a current state of the media content to an updated state and includes replacing, at least a portion of the media content with each file of the updated media as the file is downloaded;
detecting, by the digital signage device, an interruption in the download after downloading the first file and prior to downloading the second file; and
restoring, based on detecting the interruption, the media content from the updated state to the current state.

4. The method of claim 1, further comprising:
receiving, by the media player, an update notification that indicates that there is an update to the media player;
requesting, by the proxy service, a media player manifest from the media server, the media player manifest including a list of updated application files for the media player and a corresponding version identifier for each updated application file of the list of updated application files;
receiving, by the proxy service, the media player manifest;
determining, by the proxy service and based on the media player manifest, that at least one application file of the set of application files has an updated version; and
requesting, by the proxy service, the updated version of the at least one application file.

5. The method of claim 1, wherein the proxy service:
intercepts requests for media from the media player that are addressed to the media server, and
services the intercepted requests using local storage.

6. The method of claim 1, wherein the proxy service and the media player execute within the web browser, and wherein the proxy service executes within a first thread and the media player executes within a second thread that is separate from the first thread.

7. The method of claim 1, wherein accessing the media content includes accessing a set of rules that use characteristics of an environment within which the digital signage device is positioned to determine what portion of the media content is to be presented.

8. A system comprising:
one or more processors;
a non-transitory computer-readable storage medium storing instructions that when executed by the one or more processors, cause the one or more processors to perform operations including:
  loading, by a digital signage device, a media player within a web browser, wherein the media player is not installed within a file system of the digital signage device;
  initiating, by the media player of the digital signage device, execution of a proxy service by registering the proxy service with the web browser, the proxy service being configured to intercept a network request from the media player;
  accessing, by the media player, media content that includes at least one media file of a particular media format;
  retrieving, by the proxy service, a set of application files from a media server for the media player, the set of application files enabling the proxy service to load a new instance of the media player during a network interruption; and
  initiating playback of the media content.

9. The system of claim 8, wherein the operations further include:
  generating a request for updated media for playback by the media player, the request being addressed to the media server;
  intercepting, by the proxy service, the request for the updated media based on a comparison of the request to a white list of requests; and
  redirecting the request to a database.

10. The system of claim 8, wherein the operations further include:
  commencing, by the media player, a download of updated media, the updated media including a first file and a second file;
  executing, using the updated media, a batch update of the media content stored by the media player, wherein the batch update increments a current state of the media content to an updated state and includes replacing, at least a portion of the media content with each file of the updated media as the file is downloaded;
  detecting, by the digital signage device, an interruption in the download after downloading the first file and prior to downloading the second file; and
  restoring, based on detecting the interruption, the media content from the updated state to the current state.

11. The system of claim 8, wherein the operations further include:
  receiving, by the media player, an update notification that indicates that there is an update to the media player;
  requesting, by the proxy service, a media player manifest from the media server, the media player manifest including a list of updated application files for the media player and a corresponding version identifier for each updated application file of the list of updated application files;
  receiving, by the proxy service, the media player manifest;
  determining, by the proxy service and based on the media player manifest, that at least one application file of the set of application files has an updated version; and
  requesting, by the proxy service, the updated version of the at least one application file.

12. The system of claim 8, wherein the proxy service is configured to:
  intercept requests for media from the media player that is addressed to the media server, and
  service the intercepted requests using local storage.

13. The system of claim 8, wherein the proxy service and the media player execute within the web browser, and wherein the proxy service executes within a first thread and the media player executes within a second thread that is separate from the first thread.

14. The system of claim 8, wherein accessing the media content includes accessing a set of rules that use characteristics of an environment within which the digital signage device is positioned to determine what portion of the media content is to be presented.

15. A non-transitory computer-readable storage medium storing instructions that when executed by one or more processors, cause the one or more processors to perform operations including:
  loading, by a digital signage device, a media player within a web browser;
  initiating, by the media player of the digital signage device, execution of a proxy service by registering the proxy service with the web browser, wherein the media player is not installed within a file system of the digital signage device;
  registering the media player with a media server;
  receiving, from the media server and in response to registering the media player with the media server, access credentials unique to the digital signage device;
  downloading, by the media player and using the access credentials, media content that includes at least one media file of a particular media format, wherein the media content is stored within an indexed database;
  providing the access credentials from the media player to the proxy service; and
  initiating playback of the media content stored within the indexed database.

16. The non-transitory computer-readable storage medium of claim 15, wherein the operations further include:
  generating a request for updated media for playback by the media player, the request being addressed to the media server;
  intercepting, by the proxy service, the request for the updated media based on a comparison of the request to a white list of requests; and
  redirecting the request to a database.

17. The non-transitory computer-readable storage medium of claim 15, wherein the operations further include:
  commencing, by the media player, a download of updated media, the updated media including a first file and a second file;
  executing, using the updated media, a batch update of the media content stored by the media player, wherein the batch update increments a current state of the media content to an updated state and includes replacing, at least a portion of the media content with each file of the updated media as the file is downloaded;
  detecting, by the digital signage device, an interruption in the download after downloading the first file and prior to downloading the second file; and restoring, based on detecting the interruption, the media content from the updated state to the current state.

18. The non-transitory computer-readable storage medium of claim 15, wherein the operations further include:
receiving, by the media player, an update notification that indicates that there is an update to the media player;
requesting, by the proxy service, a media player manifest from the media server, the media player manifest including a list of updated application files for the media player and a corresponding version identifier for each updated application file of the list of updated application files;
receiving, by the proxy service, the media player manifest;
determining, by the proxy service and based on the media player manifest, that at least one application file of a set of application files has an updated version; and
requesting, by the proxy service, the updated version of the at least one application file.

19. The non-transitory computer-readable storage medium of claim 15, wherein the proxy service is configured to:
intercept requests for media from the media player that is addressed to the media server, and
service the intercepted requests using local storage.

20. The non-transitory computer-readable storage medium of claim 15, wherein the proxy service and the media player execute within the web browser, and wherein the proxy service executes within a first thread and the media player executes within a second thread that is separate from the first thread.

* * * * *